Patented Jan. 15, 1952

2,582,722

UNITED STATES PATENT OFFICE 2,582,722

PREPARATION OF SILICA-ALUMINA BEAD CATALYST

Robert E. Schexnailder, Jr., Baton Rouge, La., assignor to Standard Oil Development Company, a corporation of Delaware No Drawing. Application October 3, 1947, Serial No. 777,854

3 Claims. (Cl. 252—448)

The present invention pertains to the preparation of synthetic oxide gels and particularly synthetic silica-alumina gels adapted for use as catalytic agents for the conversion of hydrocarbon oils into lower boiling products or motor fuels.

Synthetic silica-alumina gels of high activity for the catalytic conversion of oils and particularly for the cracking of oils may be prepared by combining alumina or a salt convertible into alumina with a hydrous oxide of silicon, such as silica hydrosol, silica hydrogel, or gelatinous precipitates of silica and mixtures thereof in which the silica contains a substantial amount of imbibed water at the time of mixing the alumina or the aluminum salt solution therewith.

In general, many highly active cracking catalysts have been prepared according to such procedures. However, the cost of the resultant catalysts has been quite high because of the materials used. Moreover, some difficulty has been experienced in reproducing results when preparing different batches according to the same general procedure.

In an effort to prepare synthetic silica-alumina gel catalysts from less expensive materials, it has been proposed to mix alkali metal silicate solutions with alkali metal aluminate solutions and immediately after mixing said solutions, combining the mixture with a hydrochloric acid solution in a mixing nozzle. The acidified solution is then extruded as droplets into a body of gas oil wherein the droplets set to spherical or spheroidal particles of hydrogel. The particles of hydrogel were collected in a layer of water beneath the gas oil and were carried out of the system in a stream of water and washed with petroleum naphtha to remove oil from its surface. The gel particles were then washed with water and ammonium chloride solution to replace zeolitically held sodium ions by ammonium ions which can be driven off as NH3 gas by heat. The gel particles were then dried and heated to activation temperatures. This process is objectionable because of the difficulties in adding the acid to the sodium silicate-sodium aluminate mixture without precipitation and particularly because of the inconvenience occasioned by base exchanging ammonium ions for zeolitically held sodium ions.

It is the object of this invention to prepare synthetic silica-alumina gels from alkali metal silicate and alkali metal aluminate solutions in a novel and advantageous manner.

It is also the object of this invention to prepare synthetic silica-alumina gels from alkali metal silicate and alkali metal aluminate solutions which can be substantially freed of alkali ions without resorting to base exchange with ammonium salts.

These and other objects will appear more clearly from the detailed specification and claims which follow.

I have now found that synthetic silica-alumina gel catalysts can be readily prepared by reacting solutions of alkali metal silicate and alkali metal aluminate, converting the resultant mixture to a hydrogel, preferably while dispersed as relatively fine droplets in an organic medium which is immiscible or at most only partly miscible with water, adjusting the pH of the hydrogel particles and merely water washing the particles substantially free of sodium ions. This method is of great interest and importance since it permits the preparation of catalysts of this type in a simple and economical manner. Moreover, microspheres are easily formed since the setting of hydrosol to hydrogel can be readily controlled.

I may use any alkali metal silicate solution and any alkali metal aluminate solution in my process. Normally, I prefer to use a sodium silicate ($Na_2O \cdot 3.25 SiO_2$) solution having a specific gravity of about 1.20 and a sodium aluminate solution containing from about 30 to 100 grams $NaAlO_2$ per liter.

The silicate and aluminate solutions are mixed in the ratio of about 1 part of silicate to from 1 to 3 parts of aluminate, depending upon the concentration and the ratio of $SiO_2$ to $Al_2O_3$ desired in the hydrosol or resultant hydrogel. The solutions should be mixed thoroughly and rapidly, preferably in a mixing nozzle and desirably with the solutions cooled to between 30 and 50° F. The resulting hydrosol sets to the hydrogel in from about one minute to 2 hours depending upon the temperature and the composition.

The hydrosol formed by the reaction of the alkali metal silicate and alkali metal aluminate solutions is preferably extruded or otherwise dispersed in an organic liquid which is immiscible with water such as kerosene, heavy naphtha, lubricating oil, benzene, carbon tetrachloride or the like, or which is partially miscible with water such as normal butyl alcohol, secondary butyl alcohol, methyl ethyl ketone, diethyl ketone, mesityl oxide, butyl aldehyde, propionitrile, acrylonitrile, valeric acid, nitromethane and the like. Wetting or dispersing agents such as lecithin, organic sulfates or sulfonates, partial-esters of polyhydroxyl alcohols and the like can be added to the organic liquids. The dispersed particles or droplets of the silica-alumina hydrosol are maintained in said organic liquid medium, which is preferably maintained at a temperature of from 80 to 200° F. until they have set to firm hydrogel particles.

After the hydrosol particles have set to the hydrogel condition, acid is added in order to adjust the pH of the hydrogel particles to from 3.8 to 5.0 in order to facilitate the removal of sodium ions from the hydrogel by mere water washing. It is desirable, or most convenient to adjust the pH of the hydrogel in two stages, to a little on the acid side, say pH of 5 to 6 while still dispersed in the organic medium in order to permit removal of the hydrogel particles from the organic liquid by contacting with a water interface without concurrently redissolving silica and/or alumina from the hydrogel and then to a pH of 3.8 to 4.5 in the aqueous phase in order to facilitate the removal of soda from the gel.

Any acid, such as hydrochloric, sulfuric, acetic, phosphoric, nitric acids or sulfur dioxide and the like may be used to effect the adjustment of the pH of the hydrogel, although the acid is preferably one that is somewhat soluble in organic media and also in water. I prefer to use acetic acid for this purpose, not only because of its solubility characteristics but also because any residues thereof remaining in the hydrogel will be completely burned off during activation and because pH can be readily controlled within the desired range therewith.

The hydrogel particles are separated from the oil preferably at a water interface as described above and the pH of the hydrogel particles adjusted to within the range of 3.8 to 4.5 by the addition of any acid, preferably acetic acid. The hydrogel is then washed by decantation, preferably with soft or salt free water at temperatures of up to about 200° F. Normally about 20 volumes of wash water/vol. of gel will suffice to reduce the amount of $Na_2O$ to approximately 0.1%. After washing is completed, the hydrogel particles are dried and heated to from about 800–1400° F. in order to activate the particles.

The following example is illustrative of the present invention:

*Example*

One volume of a sodium aluminate solution containing 83.5 grams of sodium aluminate per liter was added to one volume of water and the diluted solution was then added to one volume of sodium silicate ($Na_2O.3.25SiO_2$) solution of 1.21 sp. gravity at a temperature of about 60° F.

The resulting hydrosol was dispersed immediately in mineral seal oil, at a temperature of about 130° F. and maintained dispersed in the oil until it was converted to hydrogel spheres. After this had taken place (about 5 minutes) glacial acetic acid was added to the dispersion until a pH of 5.2 in the hydrogel spheres was reached. The hydrogel spheres were then transferred from the oil into an aqueous medium and the pH of the spheres was adjusted to 4.2 with glacial acetic acid. The hydrogel was then washed by decantation with about 45 volumes of water at 190° F., dried and activated. The catalyst contained 17.3 wt. per cent $Al_2O_3$.

In order to test the catalytic activity of the resultant silica-alumina gel, after heating to 1550° F. for 3 hours and after steaming another sample of catalyst at 1050° F. for 24 hours at 60 p. s. i. g., a 200 cc. fixed bed reactor was charged with the thus treated catalyst. East Texas light gas oil, about 33° API gravity was cracked in this unit at 850° F. at a charging rate of 0.6 v./v./hr. The following results were obtained:

| Catalyst treatment | Per cent D+L(40° F.) |
|---|---|
| Heated for 3 hrs. at 1050° F. | 39 |
| Steamed for 24 hrs. at 1050° F. and 60 p. s. i. g. | 27.5 |

Carbon formation in the first run was 87% of that normally expected of a catalyst of this composition prepared, for example, by impregnation of a silica hydrogel. These data show that the silica-alumina gel prepared in this way has good activity and has good heat and steam stability and low carbon formation tendency, which, perhaps can be attributed to the freedom from iron in these catalysts due to its method of preparation.

The foregoing description contains a limited number of embodiments of the present invention. It will be understood, however, that numerous variations are possible without departing from the scope of the following claims.

What I claim and desire to secure by Letters Patent is:

1. A method of preparing synthetic silica alumina gel catalysts for the conversion of hydrocarbons which comprises reacting a solution of sodium aluminate with a solution of sodium silicate to thereby form a silica alumina hydrosol, dispersing the resultant hydrosol as fine droplets in a water immiscible liquid at a temperature between about 80° and 200° F., maintaining said droplets dispersed in said water immiscible liquid until the hydrosol particles are converted to hydrogel particles, then adjusting the pH of the hydrogel particles while still dispersed in said water immiscible liquid to between 5 and 6, then separating the hydrogel particles from said water immiscible liquid, then adjusting the pH of the separated hydrogel particles within the range of about 3.8 to 4.5, then water washing the hydrogel particles substantially free of sodium ions, drying and activating the gel particles.

2. The method as defined in claim 1 wherein the adjustment of the pH of the hydrogel particles is effected by the addition of glacial acetic acid.

3. A method of preparing synthetic silica alumina gel catalysts for the conversion of hydrocarbons which comprises reacting only an aqueous solution of sodium aluminate with only an aqueous solution of sodium silicate to thereby form a silica hydrosol on the alkaline side, dispersing the resultant hydrosol as fine droplets in a water immiscible liquid at a temperature between about 80° F. and 200° F., maintaining said hydrosol droplets in dispersed condition in said water immiscible liquid until the hydrosol droplets are converted to hydrogel particles, then adding glacial acetic acid to the dispersion until a pH of about 5.2 in said hydrogel particles is reached, then separating the treated hydrogel particles from said water immiscible liquid and transferring them to water, then adding glacial acetic acid to the water until a pH of about 4.2 in said hydrogel particles is reached, then washing the hydrogel particles substantially free of sodium ions with water and then drying and activating the gel particles to produce a catalyst containing about 17% alumina and about 0.1% Na$_2$O.

ROBERT E. SCHEXNAILDER, Jr.

REFERENCES CITED

The following references are of record in the file of this patent:

UNITED STATES PATENTS

| Number | Name | Date |
|---|---|---|
| 2,229,353 | Thomas et al. | Jan. 21, 1941 |
| 2,283,172 | Bates | May 19, 1942 |
| 2,283,173 | Bates | May 19, 1942 |
| 2,299,768 | Shabaker | Oct. 27, 1942 |
| 2,377,026 | Miller | May 29, 1945 |
| 2,387,596 | Marisic | Oct. 23, 1945 |
| 2,390,272 | Riesmeyer et al. | Dec. 4, 1945 |
| 2,405,408 | Connolly | Aug. 6, 1946 |
| 2,442,884 | Webb et al. | June 8, 1948 |
| 2,455,445 | See et al. | Dec. 7, 1948 |
| 2,478,916 | Haensel et al. | Aug. 16, 1949 |
| 2,480,628 | Bodking | Aug. 30, 1949 |